(No Model.)
2 Sheets—Sheet 1.

T. J. TRESIDDER.
APPARATUS FOR USE IN CHILLING ARMOR PLATES.

No. 513,843.  Patented Jan. 30, 1894.

Witnesses:
Thos. E. Robertson
W. E. Clendaniel

Inventor
Tolmie John Tresidder
By T.J.W.Robertson
Attorney

THE NATIONAL LITHOGRAPHING COMPANY,
WASHINGTON, D. C.

(No Model.) 2 Sheets—Sheet 2.

T. J. TRESIDDER.
APPARATUS FOR USE IN CHILLING ARMOR PLATES.

No. 513,843. Patented Jan. 30, 1894.

Witnesses:
Thos. E. Robertson
W. E. McDaniel

Inventor
Tolmie John Tresidder
By T. J. W. Robertson
Attorney

UNITED STATES PATENT OFFICE.

TOLMIE J. TRESIDDER, OF SHEFFIELD, ENGLAND.

APPARATUS FOR USE IN CHILLING ARMOR-PLATES.

SPECIFICATION forming part of Letters Patent No. 513,843, dated January 30, 1894.

Application filed March 27, 1893. Serial No. 467,786. (No model.) Patented in England March 30, 1891, No. 5,551, and December 18, 1891, No. 22,177.

*To all whom it may concern:*

Be it known that I, TOLMIE JOHN TRESIDDER, captain, late of Her Majesty's Royal Engineers, a subject of the Queen of Great Britain and Ireland, residing at the Atlas Iron and Steel Works, Sheffield, in the county of York, England, have invented certain Improvements in Apparatus for Use in Chilling Armor-Plates, of which the following is a specification.

My invention relates to apparatus for use in chilling armor plates by means of spray after the manner described in the specification of English Letters Patent granted to me, No. 5,551 of 1891, and No. 22,177 of 1891, and the principal objects of my present invention are to secure still greater uniformity of distribution of the chilling fluid, easy access to enable the apparatus to be cleared of any obstruction and ready adaptation of the apparatus to suit various sizes and shapes of armor plates.

According to my invention I provide what I will term main pipes made up of preferably straight lengths joined together to suit the various lengths of plates to be treated and branch pipes connected therewith constructed and arranged as hereinafter described.

I will describe my invention with reference to the accompanying drawings which illustrate what I consider the best arrangements according to my invention.

Figure 1:
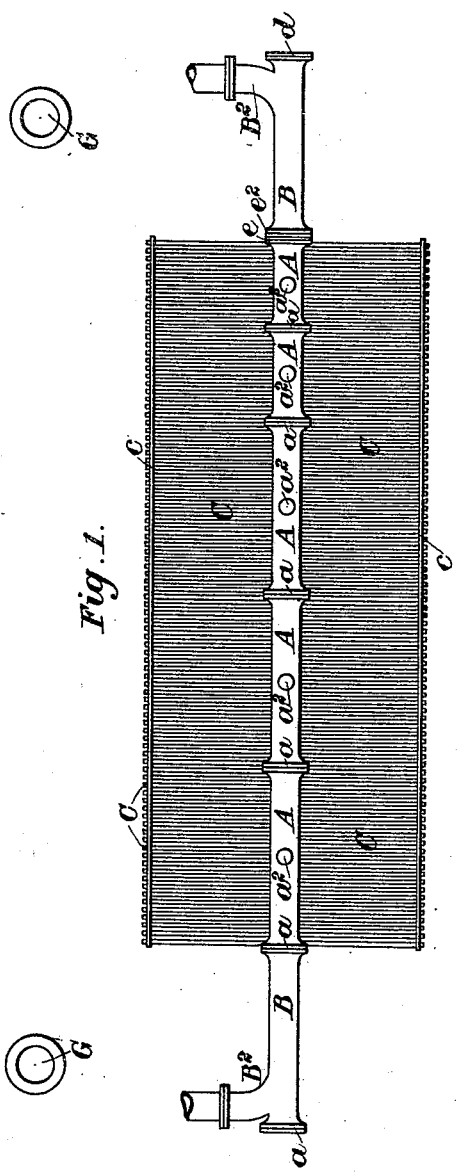
Figure 2:
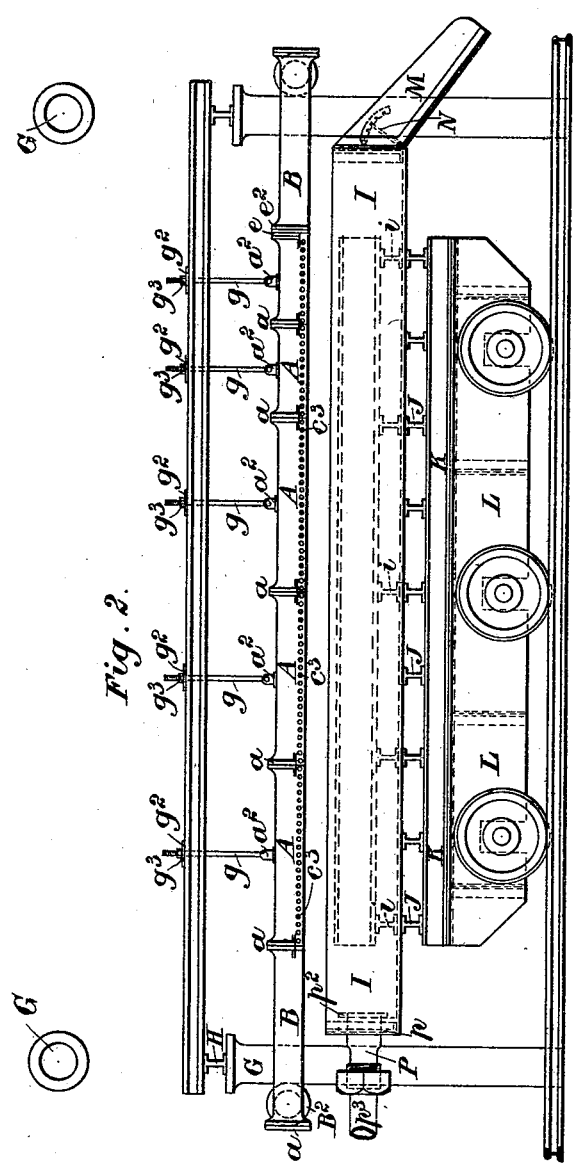
Figure 3:
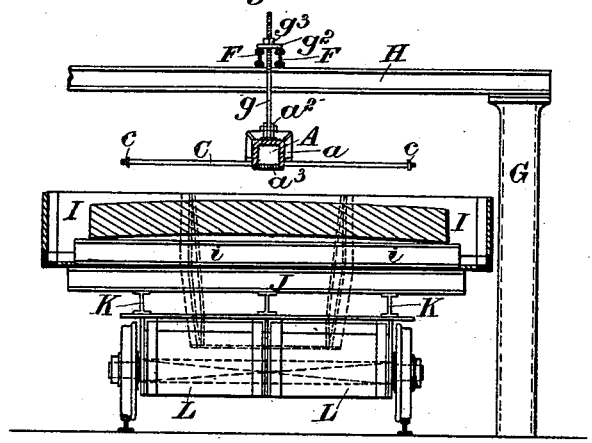
Figure 4:
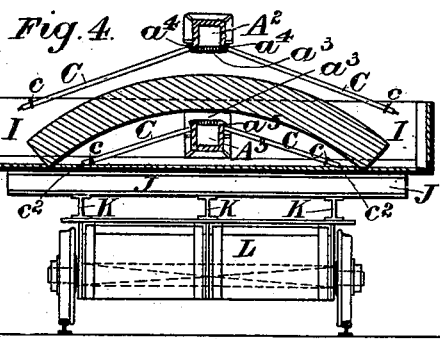
Figure 5:
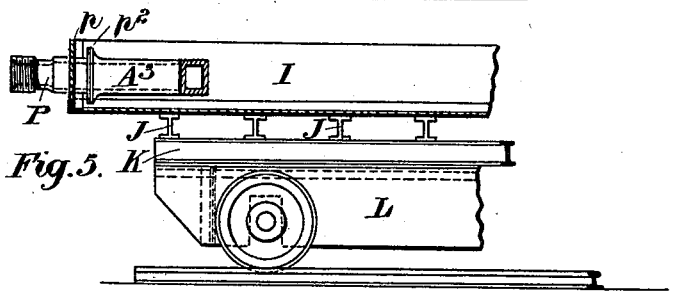
Figure 6:

Figure 1 is a general top plan of an apparatus or douche arranged according to my invention. Fig. 2 is a side elevation with a plate (shown as being slightly curved) in position for chilling and Fig. 3 is an end elevation partly in section of the same. Fig. 4 is an end elevation, partly in section, of a curved plate in position for chilling and of the modifications in the apparatus to fit it to suit the curvature of the plate and Fig. 5 is a side elevation partly in section of a part of the apparatus shown in Fig. 4. Fig. 6 is a cross-section on a larger scale of one of a series of pipes.

Referring first to Figs. 1, 2 and 3, A is the main pipe of the douche. It is made up of lengths joined together (for instance by bolts passed through the flanges $a$) so as to suit the particular lengths of plate to be treated. It will be generally convenient to keep several sizes of such lengths of main pipe A in stock. They may be of various lengths but two feet and four feet will be found convenient lengths in practice. The general cross section of this main pipe A is preferably square. The main pipe for a top douche for flat, or nearly flat, plates is drilled and tapped at or about right angles to its sides with holes (as at $c^3$ Fig. 2) for the reception of branch pipes C (as shown clearly in Fig. 3) which may conveniently be one inch gas pipes two inches apart from center to center along the whole of the lower edge of the sides of the main pipe the lengths of which latter may carry eyes $a^2$ on the top side for suspending the main pipe as hereinafter described. The lower side of the main pipe A is drilled with numerous small holes say about one-eighth inch diameter and about one inch apart (as shown at $a^3$ in Fig. 3) from which the jets of cooling fluid under pressure issue.

For a top douche for curved plates a main pipe (see $A^2$ Fig. 4) like that hereinbefore described may be used except that it has along its lower edges longitudinal ribs ($a^4$ Fig. 4) which are canted more or less so as to be readily drilled and tapped at an angle with the perforated under side of the main pipe A corresponding to the inclination of the pipes C rendered necessary by the curve of the plate.

For a lower douche for curved plates a main pipe (see $A^3$ Fig. 4) like that last described turned upside down may be used except that the cant of the ribs is reversed in the casting as shown at $a^5$ Fig. 4. Three or four varieties of this class of lengths for the main pipes $A^2$ $A^3$ with ribs of different cant will usually suffice to be kept in stock for all ordinary curvatures of plates.

The main pipe (A or $A^2$) for the upper douche is suspended from above but that ($A^3$) for the lower douche is supported from below which may be done by its resting on the ends of its branch pipes or by the main pipe resting on blocks or supports.

The lengths of the main pipes have their flanges $a$ carried only partly round, so that the sides which have the perforations $a^3$ in them have no flanges, and the sides adjoining the perforated side have the flanges carried only so far as will not allow them to interfere with the branch pipes C (as seen clearly in Figs. 2, 3 and 4) which branch pipes should be evenly spaced along the main pipes at the joints as well as elsewhere to give equal distribution of the fluid all over the plate.

End pipes B (Figs. 1 and 2) which may be of the same form in section as the main pipe A but without its perforations are attached to the ends of the main pipe A the said pipes B being closed at their outer ends by stop plates or dummy flanges $d$ and carrying curved branches $B^2$ which preferably sweep from the section of the main pipe to a circular section of say six inches interior diameter and are connected to the pump deliveries or other pressure service by which the chilling fluid is supplied. Between these end pipes B and the main pipe A at one end of the system two annular disks $e$ $e^2$ representing the thickness of two stop plates are inserted. By substituting a stop plate for one of the annular disks the chilling fluid can be supplied from one end only of the main pipe, and by removing the other of the said disks and inserting another stop plate at any joint between the lengths of the main pipe a part of the apparatus can be put out of action. This will often be more convenient than the alternative of substituting undrilled lengths of pipe for as many of the lengths of main pipe as it may be desired to put out of action when a small plate is to be treated and supply from one end will suffice.

As aforesaid the branch pipes C of the douche may be pieces of inch gas pipe. They should be straight and are threaded externally at one end or equivalently formed so that they can be secured into the main pipe and at the other end they are closed, which may be done by fitting them to receive a plug. They are of small diameter or sectional area as compared to the main pipe A and are drilled along one side with numerous holes for instance as described in the specification of my English Patent No. 5,551 of 1891. See Fig. 6. These holes are of course presented downward for a top douche and upward for a lower douche. The length of the branch pipes C for a top douche is conveniently such that the douche may serve for the widest plates, as the width of the active portion is easily reduced by inserting long plugs into the pipes sufficient to cover any desired number of the outermost holes, or plugs may be placed in as many of the outermost holes as may be necessary. For a lower douche the length of the branch pipes should preferably be such that when the main pipe is at its proper height (depending on the curvature of the particular plate to be treated) above the bottom of the tray I, the ends of the branch pipes may touch or nearly touch the tray bottom as shown at $c^2$ Fig. 4. The holes in these branch pipes will not usually be in excess of requirements but, should they be so, any portion can be closed by plugs or otherwise as hereinbefore described. Bars $c$ may be provided for placing on the branch pipes C they having in them holes fitting the branch pipes and they serve to keep the said branch pipes parallel and to stiffen the structure generally.

The top douche may be suspended from a pair of guiders or rails F any suitable arrangement being employed that admits of its height being varied so as to suit the thicknesses and curvature of various plates, it being always desirable to bring the douches pretty close to the plate to be treated. This adjustment may be effected by means of screw rods $g$ jointed at one end to the eyes $a^2$ and at the other end passing through a hole in a plate $g^2$ resting on the rails F and being fitted with a screw nut $g^3$. The connection of the branches $B^2$ with the pump or pressure service to allow of adjustment may be effected in any suitable way; for instance the connection may be made by a flexible hose. The girders or rails F may be carried on cross girders H at each end which rest on supporting columns G.

A large shallow iron tray or similar vessel I is provided which is larger than the largest armor plate to be dealt with. The said tray or vessel may rest on cross girders J carried by longitudinal girders K which may form the top of a bogie or truck L which runs on rails parallel to the main pipe or pipes of the douche. The said tray or vessel I is provided at one end with a trough M (see Fig. 2) for discharging the chilling-liquid after use either to waste or preferably to a tank or reservoir from which it may be again pumped and made use of. The said trough M is provided with a flap or weir-plate N capable of being fixed at any inclination, or height, for which purpose it may be hinged at its lower end and engage in notches in retaining bar as shown. The said weir-plate is let down when the lower douche is in use, but in other cases it may be raised to such position that the tray or vessel I retains the chilling liquid to such level as will cause the immersion to any desired extent of the lower side of a flat or nearly flat plate. Light girders $i$ may be arranged inside the said tray or vessel I for the support of flat or nearly flat plates which do not require the lower douche, but these are preferably removed when curved plates are being treated in order to keep the weight as low as possible. At the other end of the tray or vessel I a pipe P is fixed in such a manner that it can be adjusted in height and be jointed water-tightly to the tray or vessel. This may be done by passing it through a vertical slot in the end of the tray and securing it to a plate $p$ capable of being raised and lowered so that it always closes the opening in the tray or vessel I through which the pipe P passes. The said plate is secured by bolts or in any suitable way. The inner end of the pipe P is flanged, $p^2$, for coupling to the main pipe $A^3$ of the "lower douche" and the outer end is reduced and screwed or fitted to take the union coupling of a flexible hose or other connection $p^3$ from the pump delivery or other pressure service. The main pipe of the lower douche is supplied with the chilling fluid from this end and has a stop-plate at its other end. The said pipe P is plugged or otherwise closed when the lower douche is not in use.

The hot plate to be treated is put in place in the tray or vessel I while the bogie or truck L is out in the open the lower douche (if required) having previously been put in place and connected with the pipe P. The bogie or truck is then run along the rails preferably by the use of a hydraulic windlass until the plate is in its exact position under the top douche. The top douche is then started and the lower douche if it is to be used is coupled to the flexible hose $p^3$ and is also started.

In hardening flat or nearly flat plates the upper side which will be the high carbon side is generally to be chilled by the top douche while the lower, or lower carbon side is immersed in the chilling liquid contained in the tray or vessel I. In hardening plates of a curvature too great to allow of their being dealt with in this way the lower douche can be used. In either case the tray I with its discharging trough M performs the function of collecting the fluid and conveying it in any desired direction without waste or mess.

I claim—

1. In apparatus for use in chilling armor plates the combination of a main pipe connected with the supply of chilling fluid and perforated at the side presented toward the plate and having in connection with it straight or approximately straight perforated branch pipes arranged on either side at an angle thereto and of a capacity relatively to the main pipe such that all are supplied with fluid therefrom all being combined and disposed substantially as hereinbefore described.

2. In apparatus for use in chilling armor plates the combination of a main pipe made up of lengths which can be joined together and perforated on the side presented toward the plate and suspended or supported as described and equi-spaced perforated branch pipes in connection therewith the whole being arranged so that they can be readily altered to suit any required size of plate substantially as hereinbefore described.

3. In apparatus for use in chilling armor plates the combination with an upper douche of a bogie or truck carrying a tray or vessel for containing the plate to be treated and provided with an adjustable outlet (M N) for regulating the height of liquid in which the plate is partly immersed and conveying the used liquid to any desired destination, substantially as hereinbefore described.

4. In apparatus for use in chilling armor plates the combination with an upper douche of a bogie or truck carrying a tray or vessel for containing the plate and provided with a lower douche having an attachment for the connection of a supply pipe for fluid and with an outlet trough for conveying the used liquid to any desired destination substantially as hereinbefore described.

5. In an apparatus for chilling armor plates, the combination of a bogie or truck, a tray to contain the plate mounted upon said truck, and douches made in interchangeable sections, whereby the apparatus may be used for treating flat or curved plates of differing sizes, and arranged to douche either one or both sides as required, substantially as herein shown and described.

In testimony whereof I have signed my name to this specification in the presence of two subscribing witnesses.

T. J. TRESIDDER.

Witnesses:
ERNEST GLOSSOP,
*Merchant's Clerk, Atlas Works, Sheffield.*
GEO. W. JONES,
*Clerk, Atlas Works, Sheffield.*